United States Patent [19]

Hutchinson

[11] Patent Number: 4,720,302

[45] Date of Patent: Jan. 19, 1988

[54] BONDING OF CERAMIC AGGREGATES USING GELLED ALUMINUM CHLORIDE

[76] Inventor: Thomas D. Hutchinson, 3513 Rosetta La., Anniston, Ala. 36201

[21] Appl. No.: 762,271

[22] Filed: Aug. 5, 1985

[51] Int. Cl.$^4$ .................. C04B 9/02; C04B 14/00; B01J 13/00
[52] U.S. Cl. .................. 106/121; 106/85; 106/106; 106/288 B; 106/306; 106/309; 252/315.01
[58] Field of Search .................. 106/105, 288 B, 106, 106/306, 85, 309, 121; 252/315.01, 315.05, 315.06, 315.07

[56] References Cited

U.S. PATENT DOCUMENTS 4,312,674  1/1982  Stalego et al. .................. 106/106
4,335,788  6/1982  Murphey et al. .................. 106/106

Primary Examiner—Mark L. Bell

[57] ABSTRACT

It has been discovered that the mixing of a delayed action gelating agent with a ceramic powder and a solution containing aluminum and chlorine ions in the proper ratio and at a certain minimum concentration will produce a moldable aggregate which retains a viable shape after gelation.

2 Claims, No Drawings

BONDING OF CERAMIC AGGREGATES USING GELLED ALUMINUM CHLORIDE

In the manufacture of ceramic shapes, the preferred method of forming is frequently by mixing the ceramic powder with a hydraulic setting agent such as portland cement or calcium aluminate and water. The resultant slurry is poured into a mold to give the required shape. After solidification, which usually exceeds thirty minutes and frequently extends over several hours, the cast aggregate is separated from the mold and is strong enough to retain its shape. There are some disadvantages in the use of hydraulic setting cements as binders for ceramic shapes. One serious drawback is the slow setting time which reduces the rate of production of the cast shapes. Another disadvantage is the necessity of using clay free materials and relatively coarse aggregates thereby eliminating many potentially desirable raw matrerials and the ability to reproduce fine detail. A third limitation is that the cements do not have the refractory properties required to produce a cast shape which will withstand the temperatures required in steel making practice or other very high temperature processes. These are three of the limitations which have severely restricted the technology of casting ceramic shapes.

The present invention solves these and other problems easily and demonstrates a remarkable flexibility in the choice of materials which can be cast to shape. It has been discovered that if a solution containing aluminum and chlorine ions in the proper ratio is treated with alkali metal oxides or alkaline earth metal oxides at the proper concentration, a rigid gel is obtained in a short period of time. Hydroxides and, in general, basic salts of the alkali or alkaline earth metals can also, under the proper conditions, produce gelation in a short period of time. Aliphatic and some aromatic amines can also produce a delayed action gelation.

Tests have shown that the addition of a delayed action gelating agent to a solution containing aluminum and chlorine ions in the proper ratio, followed by the addition of a granular or powdered ceramic material, will produce a rigid or firm aggregate after gelation of the solution. The strength of the aggregate is sufficient to allow the removal of molds, retaining forms or patterns so that the ceramic shape can be used or further processed as a useful product. The aggregate strength can be increased by drying and heating to the higher temperatures commonly used in the processing of ceramic materials.

The relative concentration of aluminum and chlorine ions in solution is important in establishing the strength of the gel as is combined total concentration. It has been determined that when the aluminum to chlorine ion concentration ratio is less than one part of aluminum to six parts chlorine, the resultant aggregates after addition of gelating agent and ceramic materials are too fragile to handle unsupported. The higher the ratio of aluminum to chlorine, the stronger is the resultant gel and the resultant aggregate after addition of gelating agent and catalyst. It has been found in practice that ratios from 1:6 to 1:2 for the aluminum to chlorine ion concentration respectively, cover the range of viable gels.

The total concentration of the aluminum plus chlorine ions is also important. When this total concentration falls below four percent by weight of the solution, that is 4.2 parts by weight of aluminum and chlorine combined, in 100 parts by weight of the liquid in which they are dissolved, the final aggregates are too weak to handle unsupported.

The essence of this invention is illustrated by the following test results shown in Table 1., using magnesium oxide as the gelating agent, a ratio of aluminum to chlorine ions of 1:3 by weight percent and a total concentration of 5.5 percent in water as solvent. The weight of magnesium oxide used was 10 percent of the water solution weight and gelation occurred in two minutes.

TABLE 1

| Material | Silica −12 mesh | Alumina −325 mesh | Graphite −325 mesh | Zircon −30 mesh |
|---|---|---|---|---|
| Strength, psi 2 minutes after gel | 25 | 22 | 18 | 31 |
| Strength 2 hr after gel | 29 | 28 | 24 | 39 |
| Strength 2 hr at 220 F. | 35 | 34 | 31 | 42 |
| Strength 4 hr at 2000 F. | 55 | 51 | not done | 58 |

The ratios and percentages referred to throughout this disclosure are by weight of each element stated in the ratios, with solvent weight included in the total concentration. For example, when a ratio of aluminum to chlorine of 1:6 is stated with a total concentration of 7%, this means one pound of aluminum and six pounds of chlorine are dissolved in ninety three pounds of solvent.

The order of addition of the elements composing the final aggregate can be varied to meet the conditions dictated by successful production of the shaped aggregate, without compromising this disclosure. For example, the gelating agent can be pre-mixed with the solution or the ceramic materials or any portion of the ceramic materials before all the elements are brought together for the final shaped aggregate.

The aggregate prior to gelating need not be of the consistency of a castable slurry before forming the required shape. For example, it has been found that mixing five parts or less by weight of the aluminum chloride solution with one hundred parts by weight of ceramic material together with a gelating agent and ramming or blowing the aggregate into a mold, a free standing, viable shape is obtained after gelation.

In accordance with the above specifications of my invention I make the following claims:

I claim:

1. The process of forming a shaped aggregate by mixing a delayed action gelating agent, a solution containing aluminum and chlorine ions in the weight ratio 1:6 to 1:2 with a minimum total concentration of 4.2 percent in the solvent, and ceramic materials, in any order or conjointly, to form a shaped aggregate.

2. The process of forming a rigid gel by mixing magnesium oxide as the delayed action gelating agent to a solution containing aluminum and chlorine ions in the ratio 1:2.6 with a minimum total concentration of 4.2 percent in the solution.

* * * * *